US006879389B2

(12) United States Patent
Meyer et al.

(10) Patent No.: US 6,879,389 B2
(45) Date of Patent: Apr. 12, 2005

(54) METHODS AND SYSTEMS FOR SMALL PARTS INSPECTION

(75) Inventors: David S. Meyer, Clayton, MO (US); James A. Muir, Ballwin, MO (US); Daniel J. Seidel, St. Louis, MO (US); Kent F. Schien, Chesterfield, MO (US)

(73) Assignee: Innoventor Engineering, Inc., Chesterfield, MO (US)

( * ) Notice: Subject to any disclaimer, the term of this patent is extended or adjusted under 35 U.S.C. 154(b) by 433 days.

(21) Appl. No.: 10/162,112

(22) Filed: Jun. 3, 2002

(65) Prior Publication Data

US 2003/0222002 A1 Dec. 4, 2003

(51) Int. Cl.[7] .......... G01N 21/88
(52) U.S. Cl. .......... 356/237.1; 209/557
(58) Field of Search .......... 356/237.1, 244; 209/577; 348/92

(56) References Cited

U.S. PATENT DOCUMENTS

| | | | |
|---|---|---|---|
| 4,483,615 A | 11/1984 | Bieringer et al. | |
| 4,589,140 A | 5/1986 | Bishop et al. | |
| 4,604,715 A | 8/1986 | Toutant et al. | |
| 4,636,635 A | 1/1987 | Kronseder | |
| 4,658,633 A | 4/1987 | Freer | |
| 4,790,662 A | 12/1988 | Bischkopf et al. | |
| 4,805,887 A | 2/1989 | Ray | |
| 4,892,180 A | 1/1990 | Sticht | |
| 4,965,523 A | 10/1990 | Baker et al. | |
| 4,969,746 A | * 11/1990 | McConnell et al. | 356/237.1 |
| 5,095,204 A | 3/1992 | Novini | |
| 5,136,157 A | 8/1992 | Apter et al. | |
| 5,267,033 A | 11/1993 | Hoshino | |
| 5,416,589 A | 5/1995 | Lysogorski | |
| 5,419,222 A | 5/1995 | Bieg | |
| 5,463,464 A | 10/1995 | Ladewski | |
| 5,500,732 A | 3/1996 | Ebel et al. | |
| 5,506,555 A | 4/1996 | Hoshino | |
| 5,591,899 A | 1/1997 | Griesbeck | |
| 5,825,666 A | 10/1998 | Freifeld | |
| 5,845,007 A | 12/1998 | Ohashi et al. | |
| 5,910,844 A | 6/1999 | Phillips et al. | |
| 5,917,602 A | 6/1999 | Bonewitz et al. | |
| 6,011,255 A | 1/2000 | Rueb et al. | |
| 6,023,680 A | 2/2000 | Wooster et al. | |
| 6,024,526 A | 2/2000 | Slocum et al. | |
| 6,061,086 A | 5/2000 | Reimer et al. | |
| 6,064,759 A | 5/2000 | Buckley et al. | |
| 6,091,847 A | 7/2000 | Chiu et al. | |
| 6,167,607 B1 | 1/2001 | Pryor | |
| 6,191,850 B1 | 2/2001 | Chiang | |
| 6,212,961 B1 | 4/2001 | Dvir | |
| 6,234,321 B1 | 5/2001 | O'Connor et al. | |
| 6,236,734 B1 | 5/2001 | Barry | |
| 6,301,763 B1 | 10/2001 | Pryor | |

* cited by examiner

*Primary Examiner*—Richard A. Rosenberger
(74) *Attorney, Agent, or Firm*—Armstrong Teasdale LLP

(57) ABSTRACT

A method of automatically sorting and placing parts for inspection is described which includes orienting the parts within a feeder and delivering the oriented parts from the feeder to an escapement. Once the parts are delivered, they are advanced from the escapement, one at a time, down a ramp, and caught by a resilient material. The parts are then transferred ring from the resilient material to a parts fixture and positioned for inspection in the parts fixture within ±0.001 inch in a vertical direction and within 0.002 inches in x and y directions, x and y defining a horizontal plane.

34 Claims, 8 Drawing Sheets

METHODS AND SYSTEMS FOR SMALL PARTS INSPECTION

BACKGROUND OF THE INVENTION

This invention relates generally to parts inspection, and more specifically to, continuous inspection of small, intricate or delicate parts.

There are many parts within industry that by necessity are of intricate nature and manufactured to tight tolerances. One example of such a part is cylindrical glass tubes. The requirement for tight tolerances is based upon a need of the assembly in which the part is used, or the application where the part is used.

To ensure the function and quality of the assembly or application, the parts are inspected. Typically, the inspection requires labor-intensive and subjective manual inspections with measurement devices such as calipers or micrometers. Other inspection techniques provide go/no-go gauging. Each part to be inspected has tolerances associated with it, and the tolerances can lead to errors and uncertainties. One standard manufacturing practice is to make tight tolerances even tighter to compensate for the errors and uncertainties. The tighter tolerances however lead to unnecessary expenses through additional machining time and tooling costs as well as additional scrapping of parts which do not meet the tolerances that are tighter than necessary.

One inspection method known in the industry utilizes vision systems, which focus on the part and compare the part's characteristics against the predetermined pass/fail criteria (i.e. the tolerances). This method is well established and several manufacturers make such vision systems. However, within the method, the handling of fragile parts, especially those of a delicate nature, such as glass, requires manual intervention to properly handle and locate the part and present it to the vision system in order to facilitate inspection. This manual intervention entails considerable effort and expense, and still can introduce some inaccuracies and inconsistencies, which are inherent in manual operations.

One programming approach utilized in the above described vision systems is an initialization of variables on startup or reset of the controller by copying data from a memory location dedicated to the initialization of variables. Drawbacks to this approach to initialization include programming complexity of having different values for each variable, and risks associated with storing the data to memory locations, for example, corrupted memory locations. Corrupted memory locations can result in an improper reset that may create, in some systems, a potentially dangerous condition.

BRIEF DESCRIPTION OF THE INVENTION

In one aspect, a method of automatically sorting and placing parts for inspection is provided. The method comprises orienting the parts within a feeder, delivering the oriented parts from the feeder to an escapement, advancing the parts from the escapement, one at a time, down a ramp, and catching the parts from the ramp with a resilient material. The parts are transferred from the resilient material to a parts fixture and are positioned for inspection in the parts fixture within ±0.001 inch in a vertical (z) direction and within 0.002 inches in x and y directions where x and y define a horizontal plane.

In another aspect, a parts inspection system is provided. The system comprises a bowl feeder, a hopper configured to provide parts for inspection to the bowl feeder, an escapement configured to accept one part at a time for advancement and prevent additional parts from advancing, and a delivery chute configured to convey parts for inspection from the bowl feeder to the escapement. The inspection system also comprises a plurality of part fixtures configured to hold parts for inspection, an apparatus onto which the parts fixtures are mounted, and a resilient material configured to receive the parts, one at a time, dropped from the escapement. The resilient material is configured to position the part for inspection into one of the parts fixtures by decelerating the part upon impact and returning to an original position. The system also comprises an inclined ramp mounted along a portion of a perimeter of the apparatus. The ramp is configured to engage a top of a part within each fixture, the incline forcing the part into a position for inspection as the apparatus where the part fixtures are mounted advances.

In still another aspect, a parts fixture for a parts inspection system is provided which comprises a face, a curved surface within the face, a radius of the curved surface matched to a radius of the parts to be inspected, a mechanism for holding parts in place within the curved surface, and a mounting portion attached to the face.

In yet another aspect, a parts positioning apparatus is provided which comprises a parts fixture, an escapement configured to release one part at a time, a resilient material configured to receive the parts dropped from the escapement, decelerate the part upon impact and return to an original position, and position the part for insertion into the parts fixture, and an inclined ramp configured to gradually force a top of the part inserted into the parts fixture into a position for inspection as the part fixture passes the inclined ramp.

In another aspect, a method for resetting memory within a controller is provided. The method comprises writing an integer zero to a register, copying the register to all integer memory locations, writing a logic zero to a register, and copying the register to all binary memory locations.

DETAILED DESCRIPTION OF THE INVENTION

The embodiments described herein provide a method of handling parts which may be delicate and/or intricate in nature, presenting them to an inspection apparatus, for example, a vision system, and separating them into groups as classified by predetermined inspection criteria. Further provided by the embodiments described are methods for orienting and feeding the parts to a part locating mechanism for inspection. The below described mechanism locates and holds the parts for proper presentment to the inspection apparatus. Further provided is a part removal station which is configured to separate the parts according to their predetermined classification criteria, for example, acceptability for particular applications or customers. Further provided is a programming feature for variable initialization.

Figure 1:
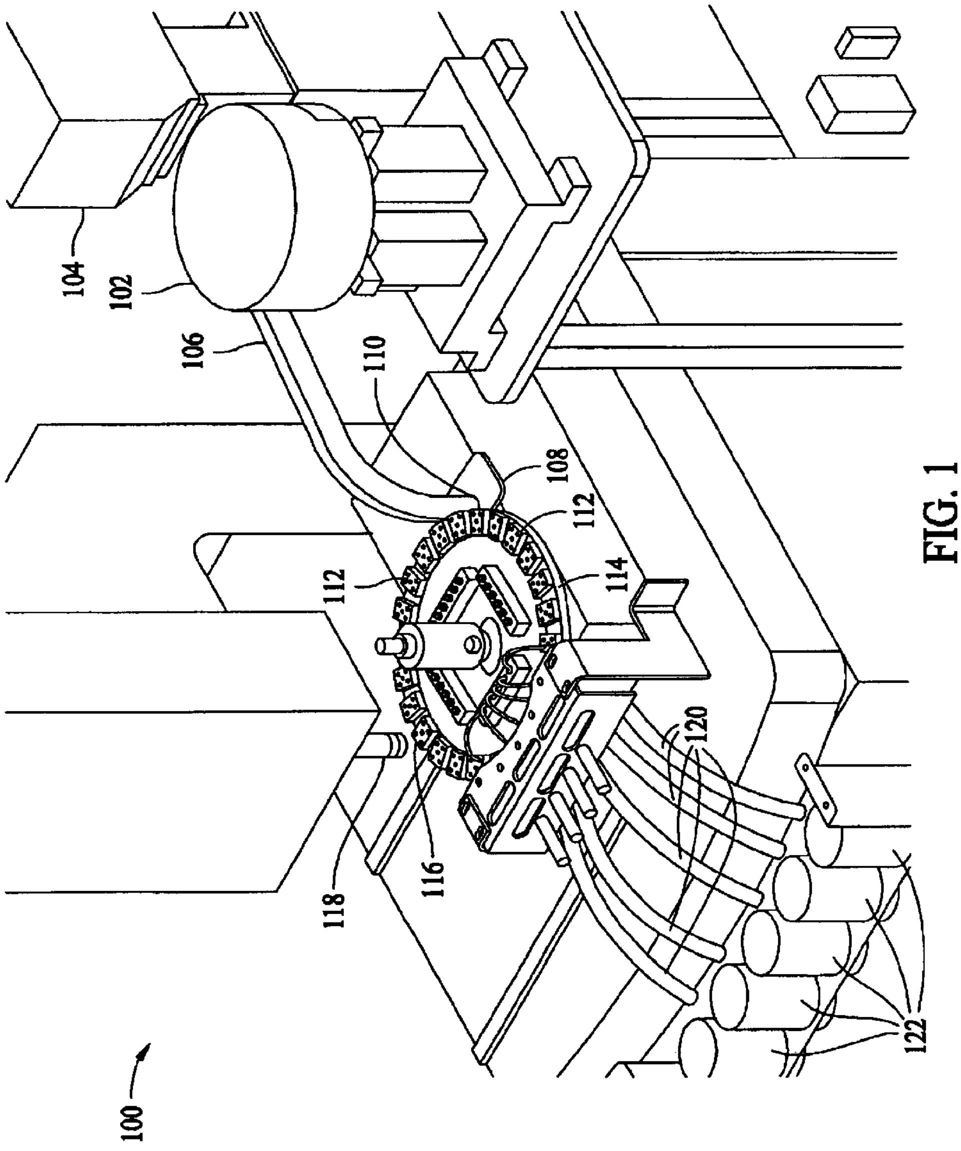
FIG. 1 is a diagram of a parts inspection system.

FIG. 1 is one embodiment of a parts inspection system 100. System 100 includes a bowl-feeder 102 and a hopper 104 that provides storage capacity for small parts, thereby allowing system 100 to operate for an extended period of time without reloading additional parts to be inspected. In the embodiment shown, bowl-feeder 102 is vibratory. In alternative embodiments, bowl-feeder 102 uses geometrical characteristics, for example, dividers and funnels, to assist orientation and advancement of parts. In the embodiment shown, bowl feeder 102 is a custom model, provided by M&S Automated Feeding Systems and hopper 104 is a standard model number 121-8450, provided by M&S Automated Feeding Systems.

System 100 further includes a delivery chute 106 which conveys the parts for inspection from bowl-feeder 102 to an escapement 108. Alternative embodiments implement a ramp or conveyor to deliver the parts to escapement 108. Escapement 108 is configured to accept one part to be advanced and presented for inspection while preventing additional parts from advancing. Escapement 108 is described in further detail below with respect to FIG. 2.

System 100 utilizes a material with resiliency to prevent damage to the part to be inspected, for example, a glass tube. In the embodiment shown the material is a coil stock spring 110. Coil stock spring is shown in greater detail in FIG. 4. In alternative embodiments, other materials and designs can be envisioned that have resiliency, for example, a block of rubber, urethane or similar material with resilient properties. A principal requirement of such a material is that it provide deceleration, upon impact, for the small part upon release from escapement 108. The material further has a controlled return to its original position after the impact by the small part. One embodiment of resilient material is described further below with respect to FIG. 4.

Still referring to FIG. 1, escapement 108 is actuated in a forward direction, pushing the part for inspection to a position where it drops onto coil stock spring 110. As described in greater detail with respect to FIG. 4, coil stock spring 110 is positioned such that it causes the part to be positioned against part fixture 112. In one specific embodiment, actuation of escapement 108 is performed utilizing pneumatic power. When escapement 108 returns to an original position after being actuated forward, it is configured to accept another part for placement onto coil stock spring 110, and eventual placement on another part fixture 112 for eventual inspection. However, other actuators are contemplated, for example, hydraulics or an electric solenoid. In a specific embodiment, described below with respect to FIG. 3, part fixture 112 is configured to retain a part in a position for inspection. The combination of escapement 108, resilient material 110, and part fixture 112 enables system 100 to have parts placed for eventual inspection, in one embodiment, within 0.002 inches in x and y directions with respect to a horizontal plane. In a specific embodiment, parts for inspection are retained in position for inspection utilizing a vacuum system.

After the part has been placed on the resilient material and affixed to part fixture 112, which controls the part placement to a tight tolerance in the x-y directions (horizontal plane), the part is aligned vertically, utilizing an inclined ramp (not shown in FIG. 1). Vertical alignment and the inclined ramp are described below with respect to FIG. 5.

After the part in fixture 112 is vertically aligned, an advancement mechanism, in the embodiment shown a rotary table 114, indexes to a next position. An exemplary rotary table is a model HRT-A5 manufactured by Haas Automation Inc. Rotary table 114 is divided into a number of segments, each corresponding to a position, and each segment includes one part fixture 112. In the embodiment shown, rotary table 114 includes 24 segments, each having one part fixture 112. Therefore, each of the 24 positions is 15 degrees apart (360 degrees divided by 24 positions). Other embodiments are contemplated which incorporate any number of segmentation schemes, where the segments are configured with one or more of part fixtures 112.

Still referring to FIG. 1, as the advancement mechanism (i.e. rotary table 114) reaches an inspection station 116 at which vision system 118 is located. Vision system 118 processes dimensional information for each part. Then, vision system 118 stores the dimensional information for each part, and determines which, if any, inspection criteria, the inspected part meets. In alternative embodiments, mechanisms other than rotary table 114 may be used to move parts from escapement 108 to inspection station 116, for example, a linear conveyor, a combination of linear actuators, a paddle-wheel style rotating device, or any other device capable of advancing the part for inspection which meets specific throughput requirements of an inspection application for accuracy and speed. While referred to herein as a vision system 118, it should be understood that other measurement systems are considered to be within the scope as possible alternatives for vision system 118, including triangulation lasers, coordinate measuring machines, and other known accurate measuring devices for parts inspection.

Once a part is inspected, rotary table 114 continues to advance until the part reaches a removal station. In the embodiment of FIG. 1, system 100 includes five removal stations at which inspected parts are separated. In alternative embodiments, a different number of removal stations may be incorporated within the inspection system. Each removal station is configured to remove parts that meet a predetermined inspection criteria for that individual station. The quantity of parts removed at each individual removal station depends on the dimensions and other properties as measured of the individual parts. Removal stations further utilize delivery tubes 120 as a portion of a mechanism for the separation of inspected parts. Part removal is shown in greater detail in FIG. 6.

Other embodiments are contemplated which assist orientation and advancement of parts, for example, a gravity fed bowl feeder (not shown) which combines geometry and gravity to feed the parts to parts fixture 112 which is then advanced to inspection station 116. In another embodiment, a conveyor and escapement (not shown) is used to feed the parts to part fixture 112. A commonality of the above embodiments is that each orients the part to be inspected when placing the parts into part fixture 112 for advancement to inspection station 116.

A controller (not shown in FIG. 1) is configured to determine, and to store in a memory location, which classification the part meets. In an exemplary embodiment, controller is a standard unit, the model 5/03 manufactured by Allen Bradley, a unit well known by those skilled in the art. A number of classifications, and their associated criteria, are programmed into the controller. Each classification is associated with one of the removal stations mentioned previously. The input for the controller is supplied from the inspection by vision system 118. Released parts at each removal station are introduced into delivery tubes 120 and gently fall into storage canisters 122, as further described below.

Figure 2:
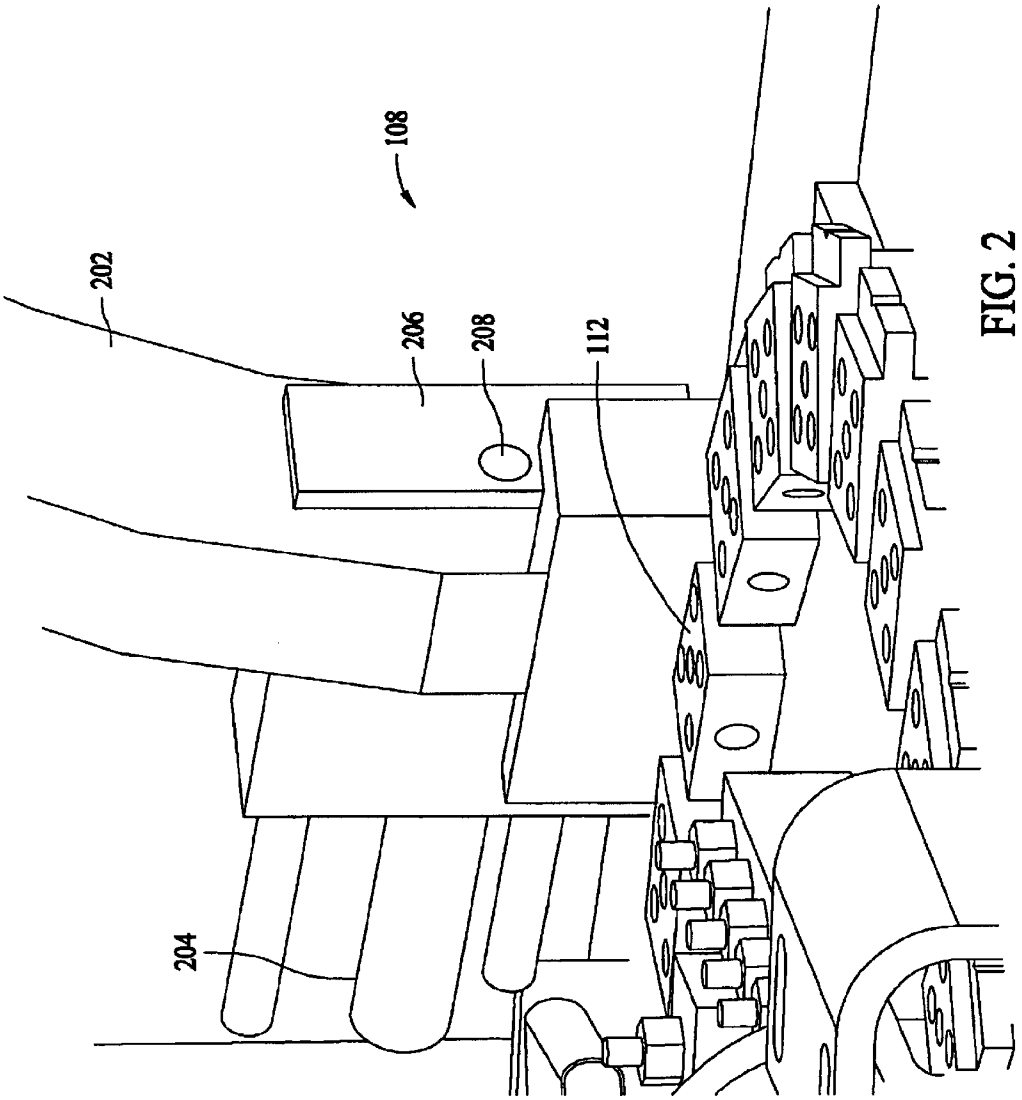
FIG. 2 is a diagram of an escapement.

FIG. 2 depicts escapement 108 in more detail. The part to be inspected is conveyed down delivery chute 202 to escapement 108. Escapement 108, in the embodiment shown, is composed of a standard pneumatic cylinder 204 and a custom fixture 206 with a rod 208, fixture 206 having a slot to accept the part to be tested. Pneumatic cylinder 204 pushes rod 208 forward, pushing one part to a final delivery slot, decelerated by coil stock spring 110 (shown in FIG. 4) above part fixture 112. Alternative to pneumatic cylinder 204, actuation is provided by at least one of an electric solenoid, a hydraulic cylinder, a vacuum, or other methods. The described embodiment provides positive separation of parts and delivery of a single part to part fixture 112. A feature of the described embodiment, as compared to existing methods such as pick-and-place equipment and robotic equipment, is that part fixture 112 is the only part manufactured to extremely tight tolerances.

Figure 3:
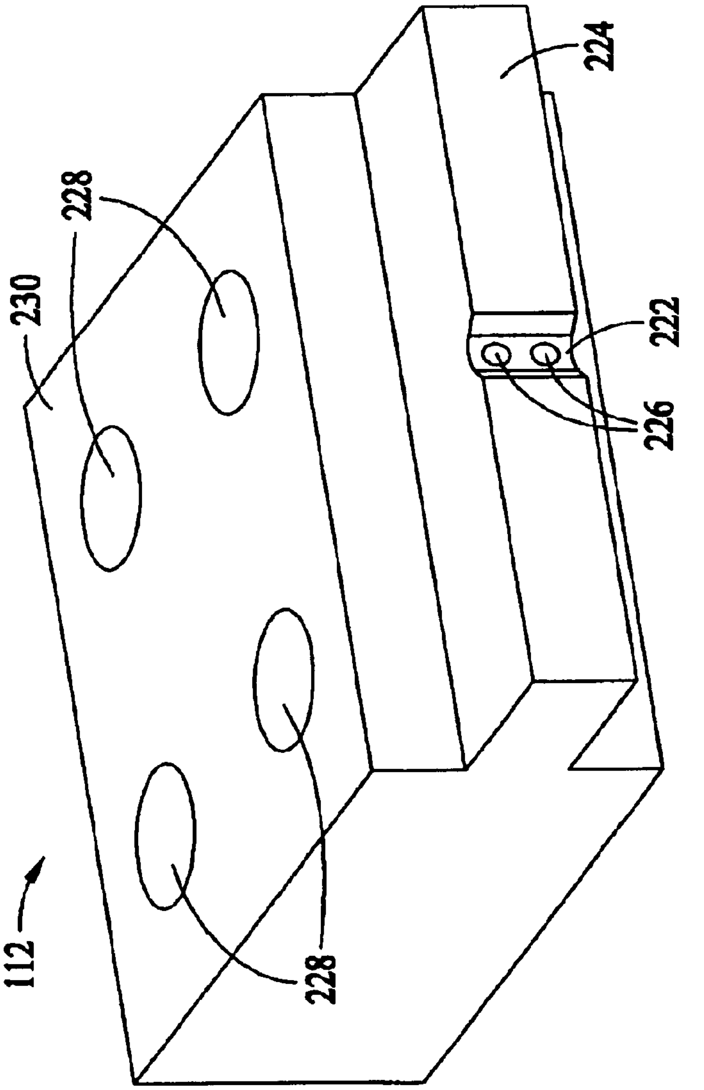
FIG. 3 is a perspective diagram of a part fixture.

FIG. 3 is a perspective diagram of part fixture 112. Fixture 112 includes a curved surface 222 in a face 224 of fixture 112. In various embodiments, curved surface 222 is machined or molded. A radius of curved surface 222 is closely matched to the parts being handled for inspection, therefore allowing the parts to be aligned with high accuracy. In a specific embodiment, the parts are within +/−0.25 degrees from vertical when held in part fixture 112. Part fixture 112 also includes a plurality of holes 226. In the embodiment shown, two holes 226 are incorporated into fixture 112 and are plumbed to a vacuum source or other means that is actuated whenever the part is required to be held in place. Fixtures 112 are held in place on rotary table 114 (shown in FIG. 1) through utilization of mounting holes 228 placed through a mounting portion 230. Mounting holes 228 allow attachment of fixtures 112 to rotary table 114 using attachment devices, for example, screws or bolts.

Utilizing a plurality of holes 226 distributes an amount of holding force provided by part fixture 112 for a given vacuum level. Therefore fixture 112 provides a coupling moment arm, which assists in retaining the part to be inspected in a vertical position (herein referred to as a z-axis) that is highly accurate, within ±0.001 inch in the embodiment described above, an accuracy which is retained when part fixture 112 undergoes subsequent accelerations and decelerations resulting from fast indexing of rotary table 114 (shown in FIG. 1). Alternative embodiments for holding parts to be inspected onto fixture 112 are contemplated, including, but not limited to, a clamping arrangement.

Figure 4:
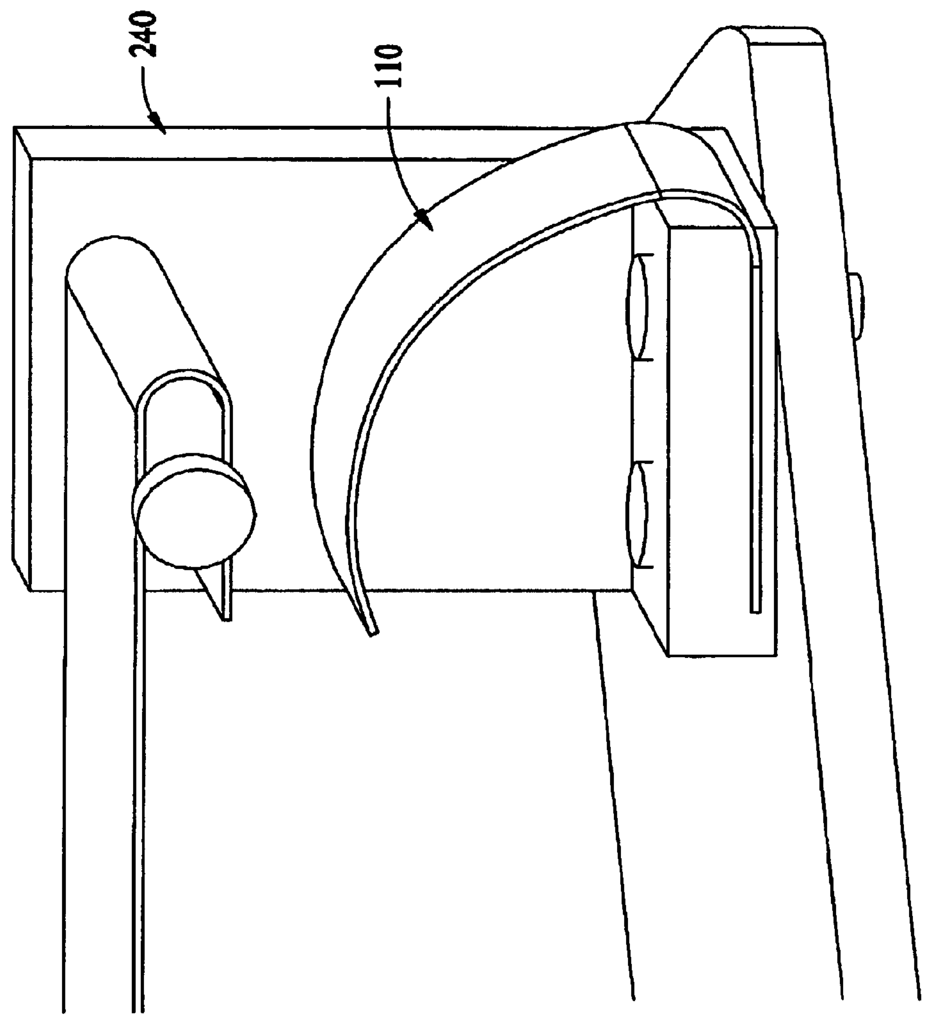
FIG. 4 is a perspective diagram of a fixture utilizing a resilient material.

FIG. 4 depicts an embodiment of a resilient material configuration. As indicated above, one embodiment is a coil stock spring 110, selected to provide a controlled deceleration rate sufficient to prevent damage to the part being handled. Coil stock spring 110 is mounted to a fixture 240. The part to be inspected is dropped onto spring 110 by escapement 108 (shown in FIG. 1). Spring 110 absorbs the impact of the part and returns to an original position. Coil stock spring 110 is positioned such that upon return to its original position, it causes the part to be positioned against part fixture 112, where a vacuum causes the part to be engaged by part fixture 112, as described above with respect to FIG. 3.

In some inspection systems, especially those employing optical inspection methods that focus on the part, accuracy of a vertical location is critical. In these known optical viewing systems, the inspection includes focusing from a fixed location above the part to be inspected. When parts are not of a highly accurate and/or repeatable height, known methods cannot locate the top of the part vertically except by pushing the part upward against a stop. It is highly advantageous to have an adjustment feature that will allow adjustment of this stop height to accommodate various factors. These factors include, but are not limited to, facilitating machine alignment with the vision system to eliminate adjusting the entire machine location with high precision. In addition, machine dimensions may change due to changes in the flooring, or temperature variations, etc. Also various focal lengths may be desirable, and adjusting the part location would be a convenient accommodation. Known methods exist for pushing parts against stops, pushing with pneumatic cylinders, for example. However these known methods do not allow for retention of highly accurate x-y positioning and are generally not compatible with small fragile parts.

Figure 5:
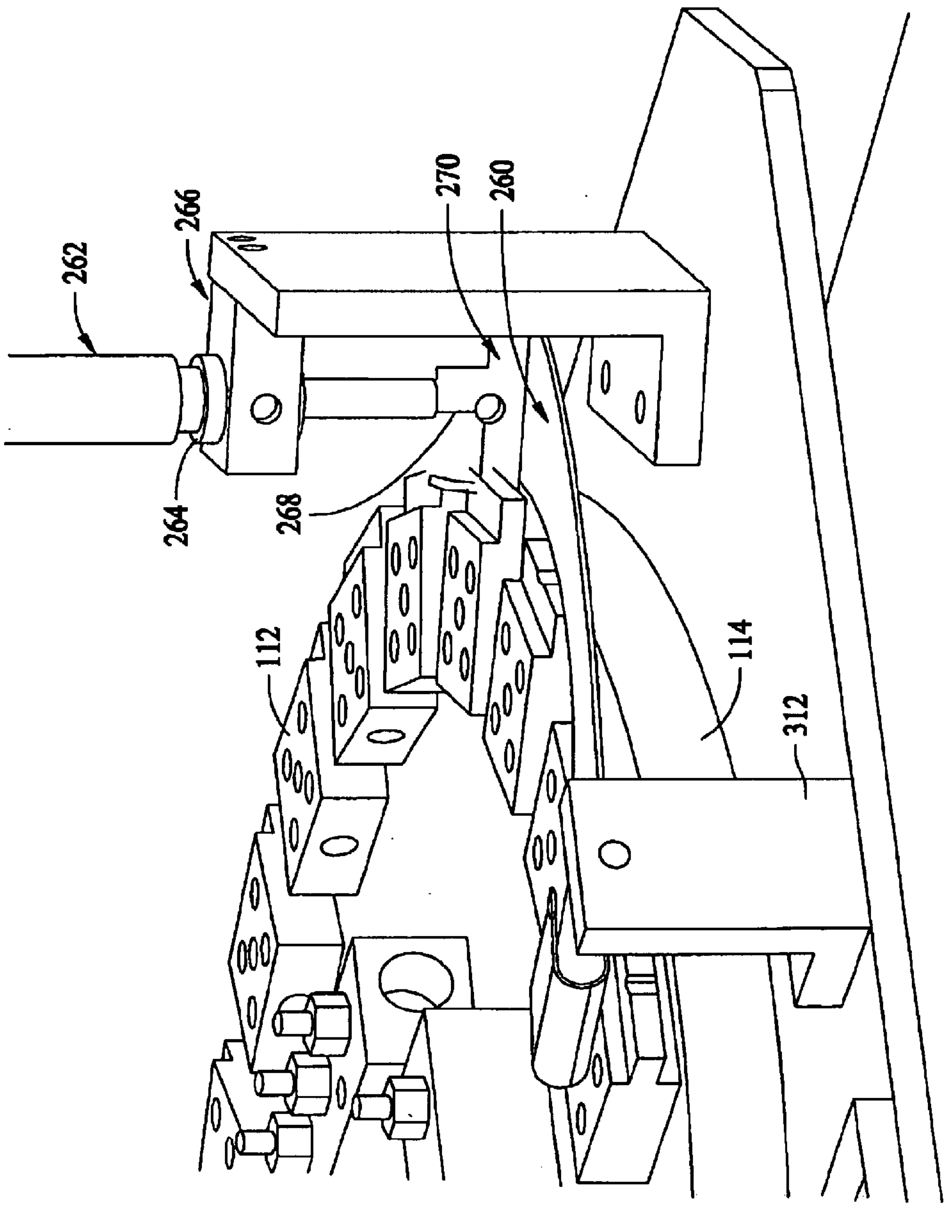
FIG. 5 is a diagram of a vertical alignment ramp.

FIG. 5 illustrates how system 100 (shown in FIG. 1) controls a vertical placement of the fragile part being inspected. An inclined ramp 260 is aligned at a slight angle such that a top of the part being inspected is very gradually forced into a proper vertical position for inspection as rotary table 114 rotates the part to be inspected under ramp 260. In this embodiment, ramp 260 is a thin metal coil stock and is located along a portion of a perimeter of rotary table 114. A final height of ramp 260, and thus the vertical position of the part underneath it, is adjusted utilizing a micrometer 262. A fixed end 264 of micrometer 262 is mounted to a fixture 266, and an adjustable end 268 of micrometer 262 is attached to rod 270. Ramp 260 is wrapped around rod 270 at an end where a height of the part is to be controlled. Micrometer 262 thus controls ramp 260 location, and thus part location. In the embodiment shown, a height of a part is positioned to within ±0.001 inch. Other fine adjustment mechanisms, in alternative embodiments, provide the proper vertical (z-axis) positioning in combination with ramp 260, for example, a fine adjustment screw, wedges, or shims.

Figure 6:
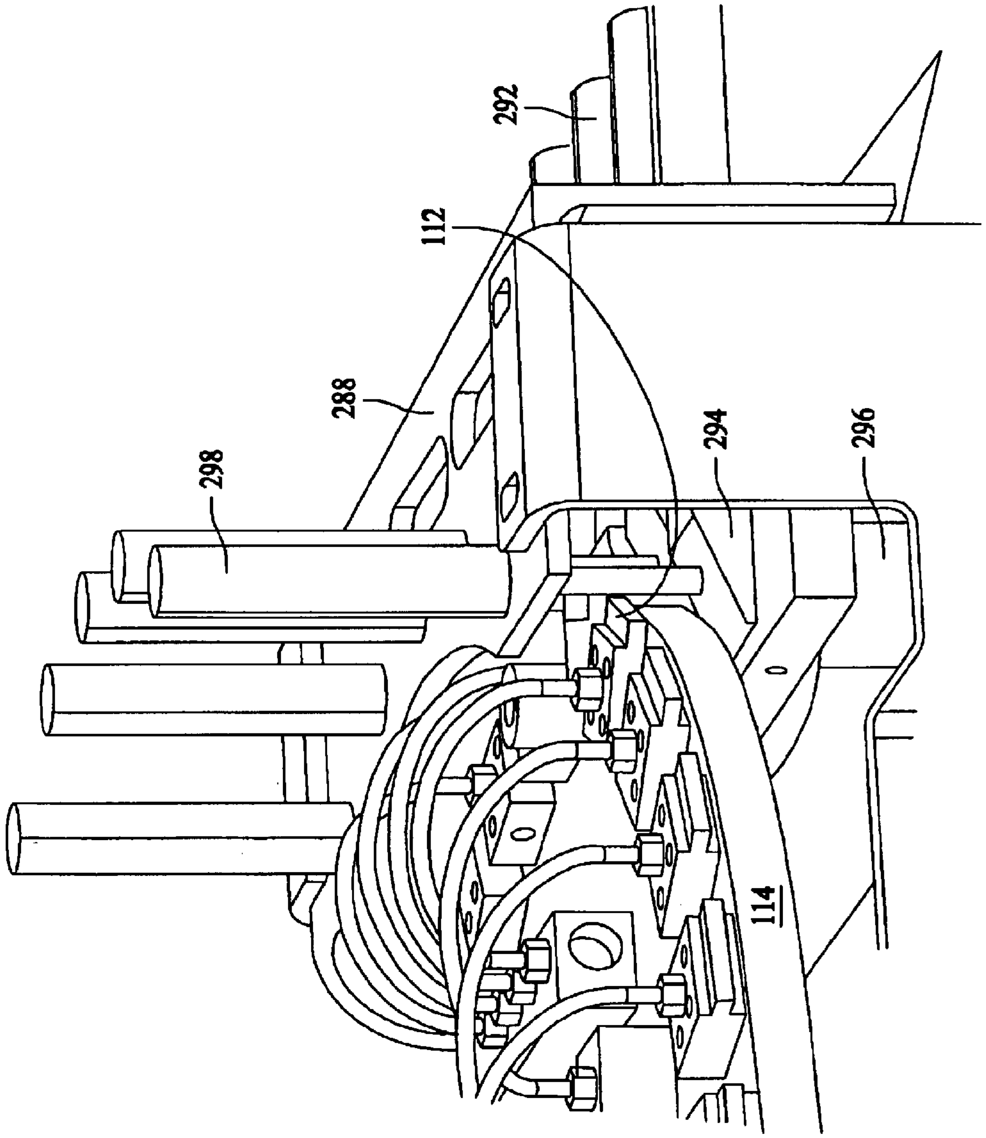
FIG. 6 is a diagram of part removal hardware.

FIG. 6 illustrates part removal from parts fixtures 112, after inspection at a part removal station 288. A controller determines, based on vision system input and predetermined criteria, at which removal station the inspected part is to be removed. For example, the controller has determined that a part held by part fixture 112 is to be removed at the first removal station. Cylinder 292 normally has tube cover 294 in position over delivery tube 296, but retracts when the part fixture in question, 112, reaches that point, based upon a rotation of rotary table 114. Cylinder 298 then extends, pushing the part off part fixture 112 and into delivery tube 296. There is a plurality of cylinders and associated equipment, five in the example shown. The part removal process is further described with respect to a vacuum system description below (FIG. 7).

Figure 7:
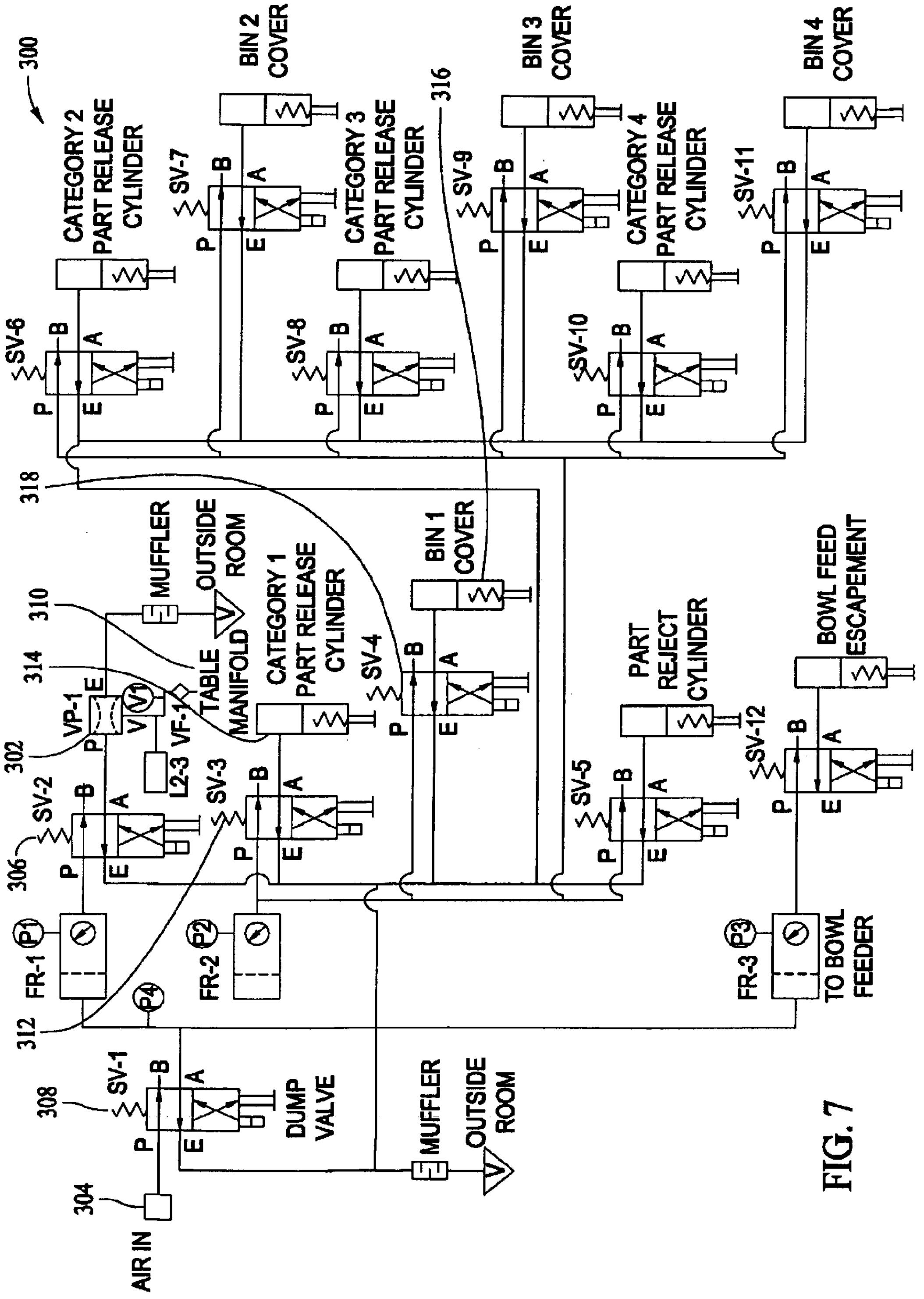
FIG. 7 is a schematic of a vacuum system.

FIG. 7 is a schematic of a vacuum system 300 as utilized within system 100. The vacuum source within system 300 is a vacuum pump 302. Pump 302 produces vacuum when supplied with compressed air source 304 via solenoid valves 306 and 308. In alternative embodiments, the vacuum source is a facility source of vacuum with a regulated pressure, an electric powered vacuum pump, or another source. Table manifold 310 distributes vacuum to each part fixture 112 (shown in FIG. 1) on rotary table 114 (shown in FIG. 1). Part fixture holes 226 (shown in FIG. 3) and vacuum system 300 are sized to provide adequate vacuum whether or not all parts are present. The inspected parts are removed from the appropriate part fixture 112 at the removal station that has previously been determined by the selection criteria as read by the vision system and as calculated by the controller. In one embodiment, if the controller has classified the inspected part as, for example, a category one part, solenoid valve 312 is energized on command from the controller to actuate part release cylinder 314. During this sequence, bin cover cylinder 316 is actuated via solenoid valve 318, removing a cover from a bin (neither shown) allowing a part to be placed within the bin. There is a duplicate set of the above described equipment for each removal station, the quantity being equal to the number of categories programmed within system 100. One category is typically a "part reject" category where the inspected part does not meet any of the other defined categories for acceptable parts. Alternate embodiments of vacuum system 300 include using solenoid valves to blow positive pressure air through the same or additional ports in part fixture 112. Another alternate embodiment does not require covers over collection devices. Additionally, other alternate embodiments are contemplated which use other known actuation methods such as hydraulic cylinders or electric actuators.

Figure 8:
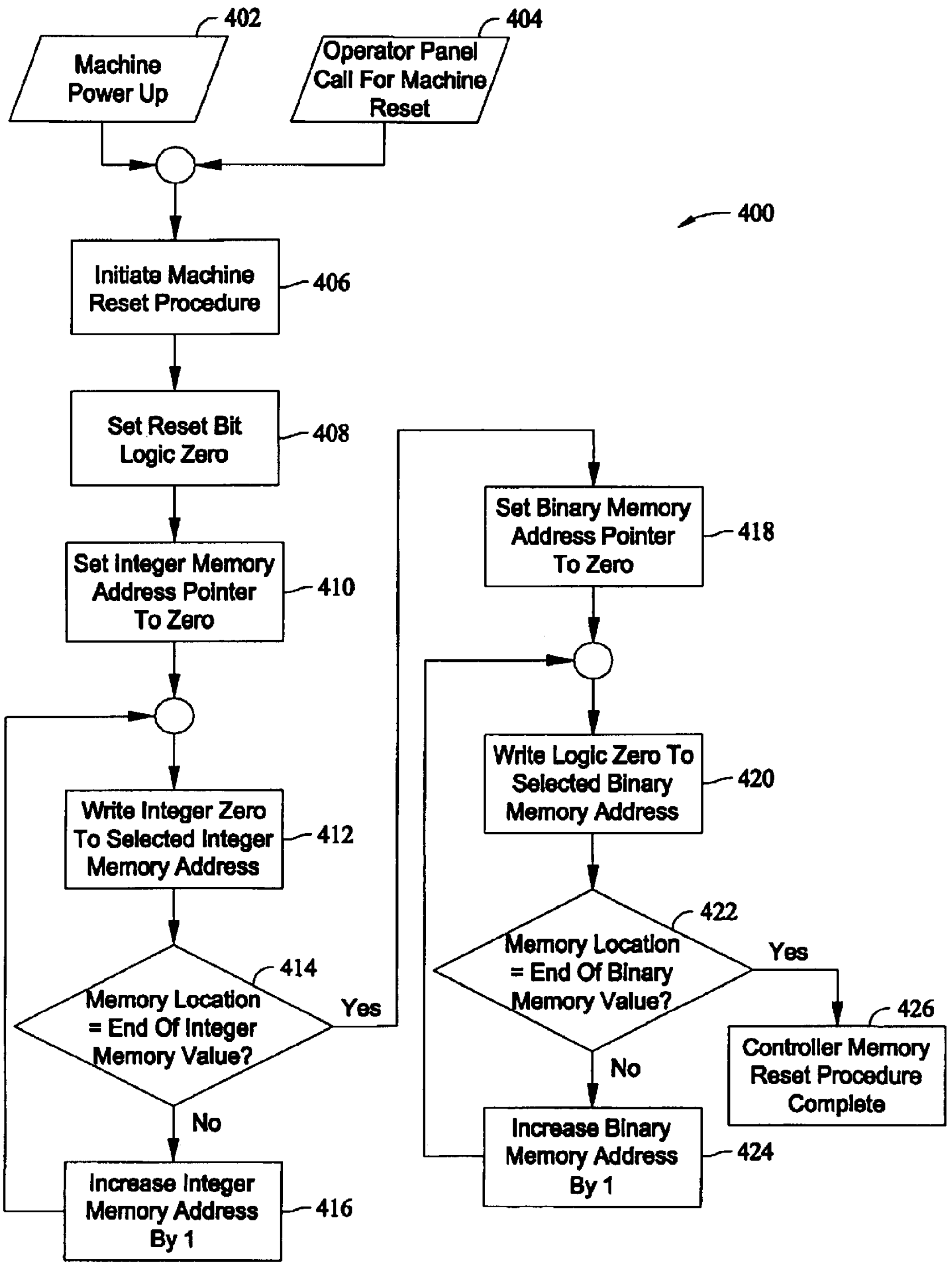
FIG. 8 is a flowchart of controller program logic.

The above referred to controller for system 100 utilizes a program that makes system 100 failsafe and places system 100 in an initialized state by zeroing program state integer memory locations and binary control bit memory locations. Program memory dedicated to integer registers are used to maintain a current state of each process performed by system 100, as well as control of all machine outputs and the status of all machine inputs. FIG. 8 is a flowchart illustrating a reset process 400. Reset process 400 is performed at machine power-up 402 and following a reset request 404 from an operator interface of the controller. A machine reset procedure is initiated 406 and a reset bit is set 408 to logic zero. An integer memory address pointer is also set 410 to zero. Integer zero is then written 412 to the selected integer memory address. The controller determines 414 if the current memory location is the end of the memory which is dedicated to integer memory. If not, the integer memory address pointer is increased 416 by one. A reset loop then sequentially writes 412 an integer zero to all integer memory locations until the address which is the end of integer memory is reached, except for the memory locations controlling reset process 400. An binary memory address pointer is set 418 to zero. Logic zero is then written 420 to the selected binary memory address. The controller determines 422 if the current memory location is the end of the memory which is dedicated to binary memory. If not, the binary memory address pointer is increased 424 by one. A reset loop then sequentially writes 420 the logic zero to all binary memory locations until the address which is the end of logic memory is reached. Reset process 400 interrupts all other machine operations. In one embodiment, reset process 400 cannot be terminated once initiated, except by terminating power to the control processor. Upon application of power to the control processor, system 100 will automatically initiate reset process 400.

Use of a single reset value for all integer and binary memory locations greatly simplifies the programming and maintenance of system 100. Maintenance technicians monitoring system 100 can quickly verify that the controller is in a reset state by verifying that zeroes are in all integer and binary memory locations. The reset process described above contrasts known reset methods as those methods reset a machine by copying the data from a memory location dedicated to machine reset to the memory locations dedicated to machine operation. In the event that the data in the reset memory locations become corrupted or overwritten, the machine will copy the errant data to the machine operation memory locations. This may result in a failed reset and the machine being placed in an undefined operating state. Reset process 400 does not use a memory location to store a reset value, but rather the reset value is hard coded into controller ladder logic and is therefore not susceptible to corruption of memory locations. Reset process 400 automatically writes an integer or binary zero into all data memory locations, ensuring that system 100 properly resets.

Parts inspection, when done utilizing the systems and methods described herein, provide a manufacturer, or other entity that must inspect parts, with a highly accurate inspection device. Accuracy of inspection is improved over known inspection devices as the system is configured to automatically present the parts for inspection, and position the parts with a high degree of accuracy. A controller for the system is configured in a way to ensure that controller memory will not become corrupted upon a system reset, helping to ensure a failsafe operation.

While the invention has been described in terms of various specific embodiments, those skilled in the art will recognize that the invention can be practiced with modification within the spirit and scope of the claims.

What is claimed is:

1. A method of automatically sorting and placing parts for inspection comprising:

orienting the parts within a feeder;

delivering the oriented parts from the feeder to an escapement;

advancing the parts from the escapement, one at a time, down a ramp;

catching the parts from the ramp with a resilient material;

transferring the parts from the resilient material to a parts fixture; and positioning the part for inspection in the parts fixture within ±0.001 inch in a vertical (z) direction and within 0.002 inches in x and y directions with x and y defining a horizontal plane.

2. A method according to claim 1 wherein orientating the parts comprises orienting and separating the parts from one another using a bowl-feeding mechanism.

3. A method according to claim 1 wherein delivering the parts comprises conveying the parts from the bowl-feeder to the escapement utilizing at least one of a delivery chute, a ramp and a conveyor.

4. A method according to claim 1 wherein advancing the parts comprises pushing the part into a position where the part can drop onto the resilient material.

5. A method according to claim 1 wherein catching the parts from the ramp comprises:

providing deceleration for the part upon impact; and providing a controlled return of the resilient material to an original position.

6. A method according to claim 1 wherein the resilient material comprises coil stock spring-material.

7. A method according to claim 1 transferring the parts from the resilient material comprises providing a vacuum to hold the parts within the parts fixture.

8. A method according to claim 1 wherein positioning the part for inspection comprises:

mounting a plurality of parts fixtures to a rotary table;

providing an inclined ramp along a perimeter of the rotary table which is configured to engage a top of a part held by the parts fixture; and rotating the table unit the incline of the ramp forces the top of the part into a position for inspection.

9. A method according to claim 8 wherein the incline of the ramp is set using a micrometer.

10. A parts inspection system comprising:

a bowl feeder;

a hopper configured to provide parts for inspection to said bowl feeder;

an escapement configured to accept one part at a time for advancement and prevent additional parts from advancing;

a delivery chute configured to convey parts for inspection from said bowl feeder to said escapement;

a plurality of part fixtures configured to hold parts for inspection;

an apparatus onto which said parts fixtures are mounted;

a resilient material configured to receive the parts, one at a time, dropped from said escapement and further configured to position the part for inspection into one of said parts fixtures, said resilient material configured to decelerate the part upon impact and return to an original position; and an inclined ramp mounted along a portion of a perimeter of said apparatus, said ramp configured to engage a top of a part within each fixture, the incline forcing the part into a position for inspection as said apparatus where said parts fixtures are mounted advances.

11. A parts inspection system according to claim 10 wherein said parts fixture comprises:

a face;

a curved surface within said face, a radius of said curved surface matched to a radius of the parts to be inspected; and a mechanism for holding parts in place within said curved surface; and a mounting portion attached to said face.

12. A parts inspection system according to claim 11 wherein said mechanism for holding parts in place comprises a plurality of holes within said curved surface, said holes being plumbed to a vacuum source configured to provide a vacuum to hold the part to be inspected in place.

13. A parts inspection system according to claim 11 wherein said parts fixture is configured to holds parts for inspection within 0.25 degrees from vertical.

14. A parts inspection system according to claim 11 wherein said curved surface of said parts fixture is at least one of machined or molded.

15. A parts inspection system according to claim 11 wherein said mounting portion of said parts fixture comprises a plurality of mounting holes, said mounting holes configured to accept an attachment device to hold said parts fixture in place on a surface.

16. A parts inspection system according to claim 10 wherein an incline of said inclined ramp is adjusted using at least one of a micrometer, an adjusting screw, a wedge, and a shim.

17. A parts inspection system according to claim 10 wherein said escapement comprises a cylinder, a slot to accept a part to be tested and a rod, said rod configured to be pushed by said cylinder and to remove the part to be inspected from said slot.

18. A parts inspection system according to claim 17 wherein said cylinder is one of pneumatic, hydraulic, a solenoid, and a vacuum.

19. A parts inspection system according to claim 10 wherein said mechanism comprises at least one of a rotary table, a linear conveyor, a rotating device, and a combination of linear actuators.

20. A parts inspection system according to claim 10 wherein said mechanism is a rotary table, said rotary table divided into a number of segments, one of said parts fixtures mounted within each segment of said rotary table.

21. A parts inspection system according to claim 10 further comprising:

a controller; and a measurement system configured to inspect the parts and provide inspection data to said controller, said measurement system being one of a vision system, a triangulation laser, and a coordinate measuring machine.

22. A parts inspection system according to claim 21 further comprising at least one removal station, said removal stations configured to accept or reject inspected parts according to inspection criteria received from said controller.

23. A parts inspection system according to claim 22 wherein said removal stations each comprise:

a part release cylinder;

a solenoid valve configured to activate said part release cylinder;

a delivery tube to accept the parts;

a parts bin comprising a cover;

a bin cover cylinder; and a bin solenoid valve configured to activate said bin cover cylinder, removing said cover.

24. A parts inspection system according to claim 22 wherein to accept a part, said removal station is configured to remove a vacuum from said parts fixture.

25. A parts inspection system according to claim 21 wherein said controller is configured with a reset process which configures controller to:

write an integer zero to a register;

copy the register to all integer memory locations;

write a logic zero to a register; and copy the register to all binary memory locations.

26. A parts fixture for a parts inspection system, said fixture comprising:

a face;

a curved surface within said face, a radius of said curved surface matched to a radius of the parts to be inspected;

a mechanism for holding parts in place within said curved surface; and a mounting portion attached to said face.

27. A parts fixture according to claim 26 wherein said mechanism for holding parts in place comprises a plurality of holes within said curved surface, said holes being plumbed to a vacuum source configured to provide a vacuum to hold the part to be inspected in place.

28. A parts fixture according to claim 26 configured to holds parts for inspection within 0.25 degrees from vertical.

29. A parts fixture according to claim 26 wherein said curved surface is at least one of machined or molded.

30. A parts fixture according to claim 26 wherein said mounting portion comprises a plurality of mounting holes, said mounting holes configured to accept an attachment device to hold said fixture in place on a surface.

31. A parts positioning apparatus comprising:

a parts fixture;

an escapement configured to release one part at a time;

a resilient material configured to receive the parts dropped from said escapement, decelerate the part upon impact and return to an original position, and position the part for insertion into said parts fixture; and an inclined ramp, said inclined ramp configured to gradually force a top of the part inserted into said fixture into a position for inspection as said part fixture passes said inclined ramp.

32. A parts positioning apparatus according to claim 31 wherein said resilient material comprises coil stock spring.

33. A parts positioning apparatus according to claim 31 wherein said inclined ramp comprises thin metal coil stock.

34. A parts positioning apparatus according to claim 31 wherein an incline of said inclined ramp is set using at least one of a micrometer, an adjustment screw, a wedge, and a shim.

* * * * *